United States Patent
Matsumiya

[11] Patent Number: 5,857,745
[45] Date of Patent: Jan. 12, 1999

[54] VEHICLE SEAT

[75] Inventor: James Akira Matsumiya, Buckinghamshire, England

[73] Assignee: L. A. Rumbold Limited, Warwick, United Kingdom

[21] Appl. No.: 914,008

[22] Filed: Aug. 15, 1997

[30] Foreign Application Priority Data

Aug. 22, 1996 [GB] United Kingdom ................... 9617706

[51] Int. Cl.⁶ ............................. B60N 2/24; B60N 2/34
[52] U.S. Cl. ............................. 297/354.13; 297/184.14; 297/118; 244/118.6; 244/122 R; 305/316
[58] Field of Search ................. 297/354.13, 184.14, 297/184.1, 118; 5/9.1, 18.1, 37.1; 105/314, 315, 316, 322, 323; 244/118.5, 118.6, 122 R; 296/65.1, 69

[56] References Cited

U.S. PATENT DOCUMENTS

| | | | |
|---|---|---|---|
| 2,034,985 | 3/1936 | Lilley | 5/37.1 |
| 2,243,984 | 6/1941 | Singewald | 207/184.14 |
| 2,348,407 | 5/1944 | O'Neill | 297/67 |
| 4,620,335 | 11/1986 | Dodgen | 296/69 |
| 5,628,547 | 5/1997 | Matsumiya . | |

FOREIGN PATENT DOCUMENTS

| | | | |
|---|---|---|---|
| 0639479 | 2/1995 | European Pat. Off. . | |
| 3101163 | 8/1982 | Germany | 5/18.1 |

*Primary Examiner*—Peter M. Cuomo
*Assistant Examiner*—Anthony D. Barfield
*Attorney, Agent, or Firm*—Davis and Bujold

[57] ABSTRACT

A vehicle seat has a seat pan and a seat back which is reclinable from a normal substantially vertical position to a sleeping position in which it forms a substantially continuous surface with the seat pan. A generally vertical partition is located behind the seat and mounted for linear movement between a forward position adjacent to the top of the seat back when in its fully upright position and a rearward position adjacent to the top of the seat back when in its fully reclined position.

10 Claims, 4 Drawing Sheets

VEHICLE SEAT

FIELD

This invention relates to a vehicle seat, especially an aircraft passenger seat, of the type having a seat pan and a seat back which is reclinable from a normal substantially vertical position to a sleeping position in which it forms a substantially continuous surface with the seat pan.

RELATED ART

Seats of this type are described in U.S. Pat. No. 5,628,547. Such seats are commonly known as sleeper seats. When such a seat is in its sleeping position, the seat occupant is on view to the occupants of any seats positioned behind the seat in question. For many people, this lack of privacy inhibits relaxation. The present invention aims to provide a sleeper seat with enhanced privacy when in the sleeping position.

SUMMARY OF THE INVENTION

According to the invention, a vehicle seat of the type described above has a generally vertical partition located behind the seat and mounted for linear movement between a forward position adjacent to the top of the seat back when in its fully upright position and a rearward position adjacent to the top of the seat back when in its fully reclined position.

The partition may be mounted on rails. Preferably, the rails extend from a position under the seat to a position which is in front of the rear edge of the partition when the latter is in its forward position so that the rails are, at all times, covered by the seat and the partition.

To enhance privacy from occupants of seats adjacent to the seat in question, a flexible fabric screen may be suspended from a cable which, when deployed extends from the upper edge of the movable partition to a location near the front of an armrest of the vehicle seat.

DETAILED DESCRIPTION OF THE PREFERRED EMBODIMENTS

Figure 1:
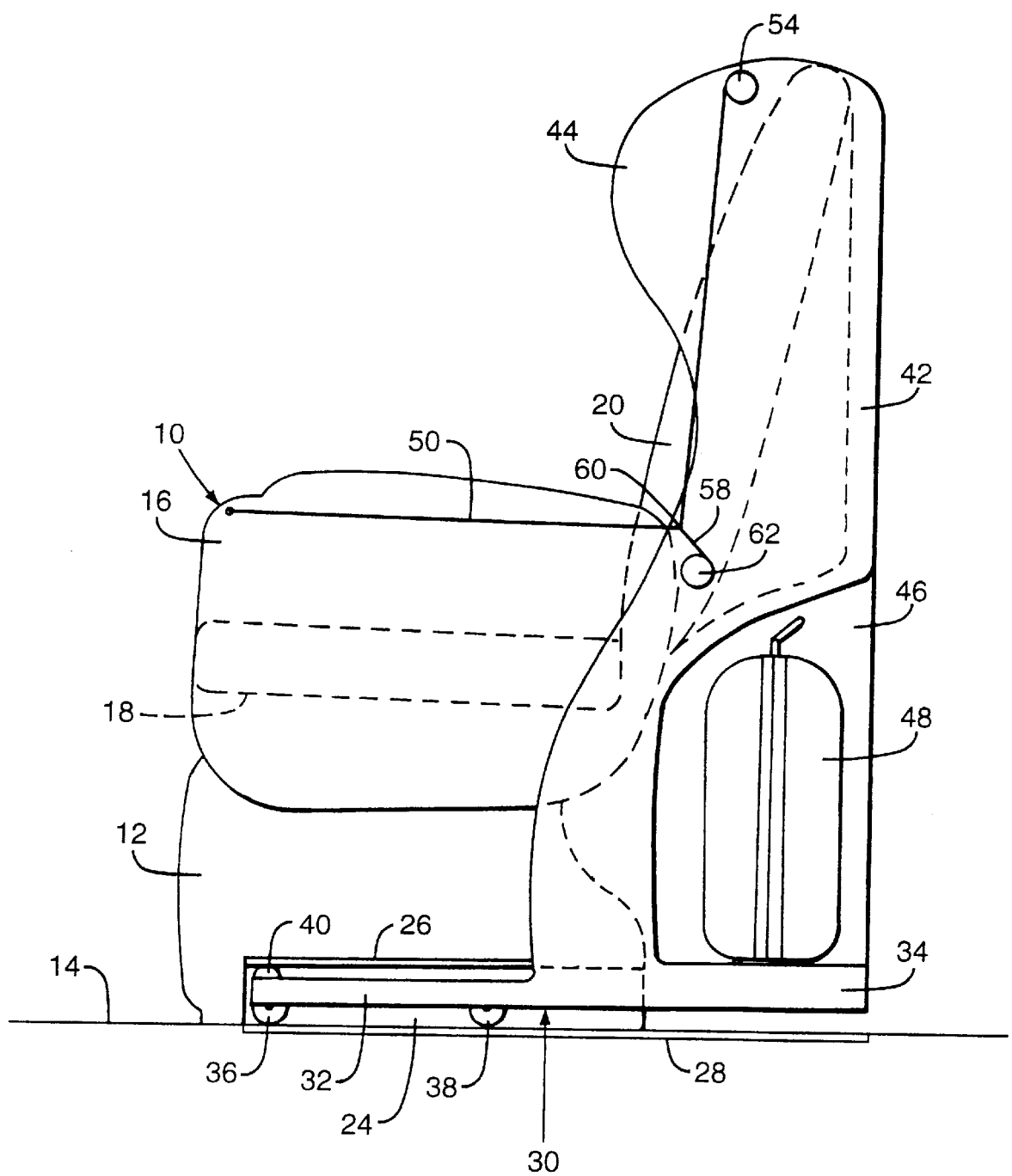
FIG. 1 is a side view of a vehicle seat in accordance with the invention, with the seat back in its upright position.
Figure 2:
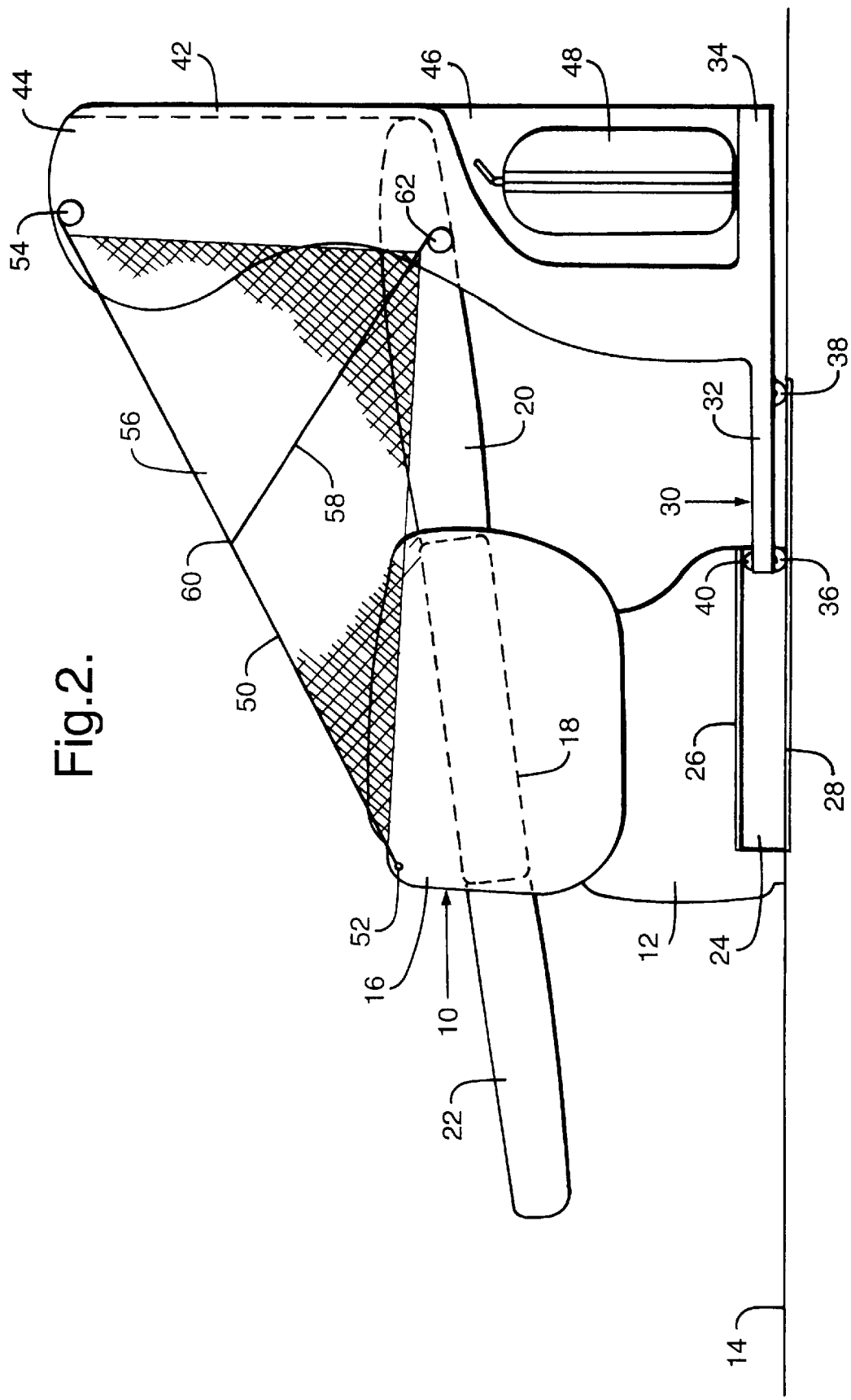
FIG. 2 is a side view of the seat shown in FIG. 1, but with the seat back in its fully reclined position.

FIGS. 1 and 2 show an aircraft passenger seat 10 having a base member 12 which is mounted on an aircraft floor 14 and supports a pair of armrests 16. A seat pan 18 and a seat back 20 are mounted between the armrests 16 so as to be movable between an upright position as illustrated in FIG. 1, and a sleeping position as illustrated in FIG. 2. In addition, a footrest 22 is movable between a stowed position (not shown) and a sleeping position (shown in FIG. 2) in which it is substantially aligned with the seat pan 18 and the seat back 20. This type of seat forms the subject of EP-A-0639479 and will not be described in detail as such means for allowing the seat to be reclinable between an upright and sleeping position is conventional in this art.

Each side of the bottom of the base 12 contains a channel 24, the outer side and rear end of which are open. Each channel 24 contains a track 26 in its upper surface. A similar pair of tracks 28 is recessed into the aircraft floor 14, one below each channel 24, the tracks 28 extending behind the seat base 12 by a distance rather less than the length of the channels 24, as will be explained hereinafter.

A trolley 30, which is U-shaped in plan view, has respective front portions 32 which extend into the channels 24, and which are joined together by a rear portion 34. Each front portion 32 has a lower front wheel 36 and a rear wheel 38 which are supported on the corresponding track 28, together with an upper front wheel 40 which engage with the corresponding track 26. The rear portion 34 is cantilevered behind the rear wheels 38 and has a generally vertical partition 42 mounted thereon. The partition 42 has side wings 44 which project forwardly on each side of the seat 10. A recess 46 in the lower part of the rear surface of the partition 42 can accommodate a piece of luggage 48 belonging to a passenger occupying a seat located behind the seat 10.

When the seat 10 is in its upright position (FIG. 1), the trolley 30 is at the front of the tracks 28, with its front portions 32 accommodated within the channels 24 and the rear edge of the rear portion 34 aligned with the rear ends of the tracks 28. As the seat 10 is moved to its reclined position (FIG. 2), the trolley 30 moves along the tracks 28 to a position until the rear wheels 38 are at the rear ends thereof. In both positions, the top of the seat back 20 either abuts against or is just clear of the partition 42, which thus provides privacy from the occupant of a seat behind the seat 10.

In order to provide additional privacy, a cable 50 (FIG. 2) extends from an anchorage 52 on the front of one of the armrests 16 to a retractor 54 on the top of one of the side wings 44 of the partition 42. A fabric screen 56 is suspended from the cable 50 so as to fill the space between the top of the armrest 16 and the front of the side wing 44 when the seat 10 is in its sleeping position. When the seat 10 is moved to its upright position, as shown in FIG. 1, an auxiliary cable 58, which extends from an intermediate point 60 on the cable 50 to a retractor 62 at a location on the partition 42 below the top of the armrest 16 pulls the cable 50 to a position in which it is either behind the front edge of the side wing or below the top of the armrest 16. The screen 56 bunches below the cable 50 and may be stowed in suitable recesses in the outer surface of the armrest 16 and the wing 44. The screen 56 is preferably made of a fine mesh or similar open weave material so that a cabin attendant can readily see whether the seat occupant has his reading light and might appreciate refreshment or has his reading light off and does not wish to be disturbed.

Figure 3:
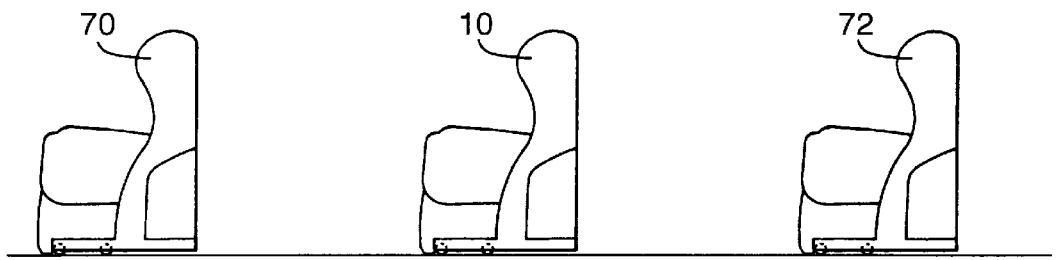
FIG. 3 is an outline side view of three seats of the type shown in FIGS. 1 and 2, in adjacent rows, with their seat backs in the position shown in FIG. 1.
Figure 4:
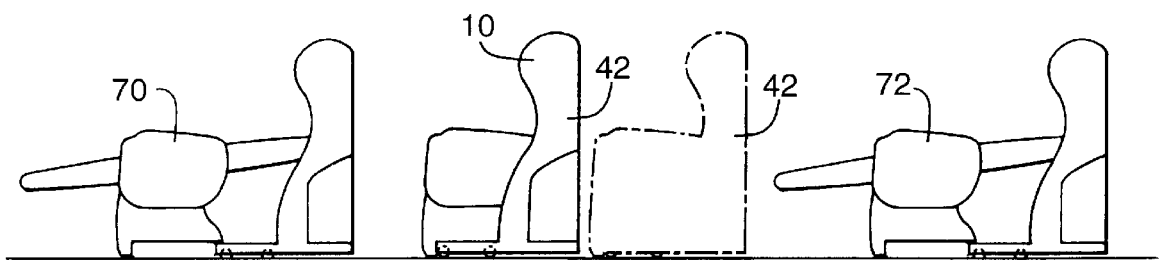
FIG. 4 is an outline side view of the three seats shown in FIGS. 3 and 2, the middle seat having its seat backs in the position shown in FIG. 1 and the other two seats having their seat backs in the position shown in FIG. 2.
Figure 5:
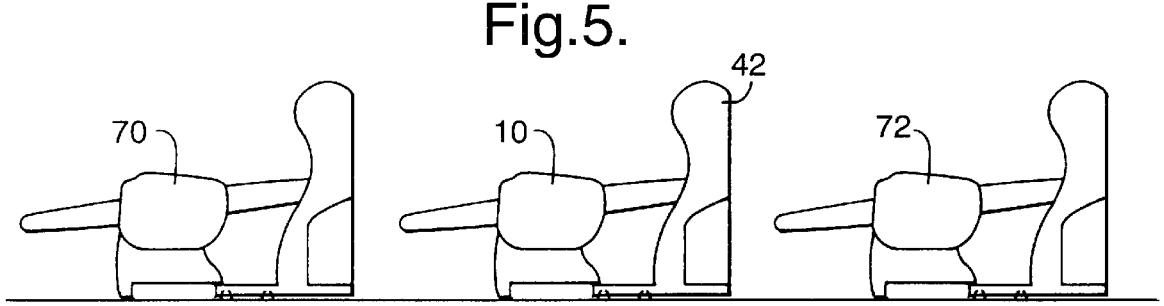
FIG. 5 is an outline side view of the three seats shown in FIGS. 3 and 4, with their seat backs in the position shown FIG. 2.

FIGS. 3, 4 and 5 show the seat 10 together with a similar seat 70 immediately in front and another similar seat 72 immediately behind. FIG. 3 shows all three seats 10, 70 and 72 in their upright positions and their respective partitions 42 in their forward positions, as shown in FIG. 1. This is the required position for take-off and landing, wide gangways being provided in front of each seat. FIG. 4 shows the seat 10 still upright and the other two seats 70 and 72 fully reclined, as shown in FIG. 2. FIG. 5 shows all three seats fully reclined.

In order to avoid any risk of surprising an occupant of a seat such as the seat 72 if the partition 42 of the seat 10 moves backwards unexpectedly during flight, some airlines may prefer to secure all such partitions in their rearward positions during flight, even when a seat is upright (as shown in chain-dotted lines in FIG. 4) and to move them to their forward positions only for take-off and landing. This also avoids any risk of a moving partition 42 jogging the arm of a steward who is serving refreshments to a passenger in the seat behind such partition.

Figure 6:
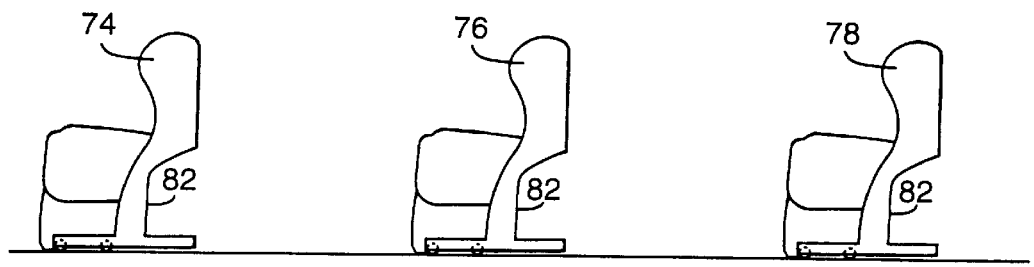
FIGS. 6, 7 and 8 are outline side views corresponding to FIG. 3, 4 and 5 respectively, of three seats of a modified type.
Figure 7:
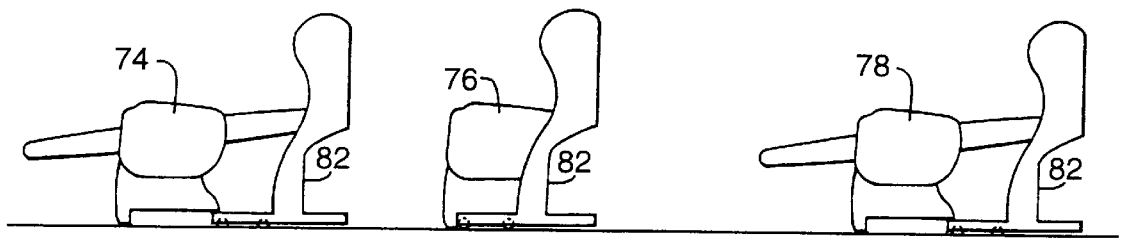
Figure 8:
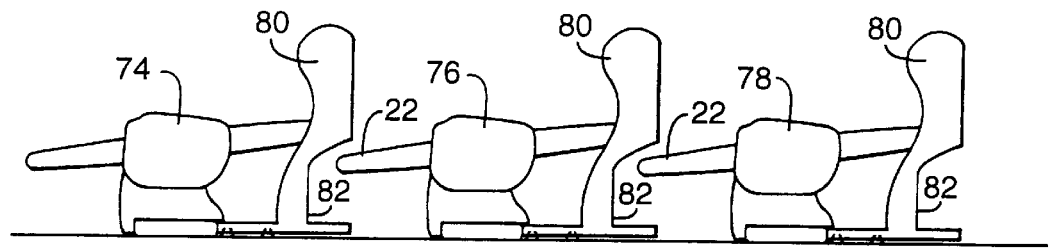

FIGS. 6, 7 and 8 show three seats 74, 76 and 78 which differ from the seats 10, 70 and 72 in that their partitions 80 each have a wider recess 82 than the recess 46 of FIGS. 1 to 5. Each recess 82 extends across the full width of the seat 74, 76, 78 and is high enough to receive the footrest 22 of the seat behind extends when the seat is fully reclined. Although this arrangement limits the height of clear space above the footrest 22, it enables the advantages of the invention to be obtained with a narrower seat pitch than that required for the seats 10, 70 and 72. The seats 74, 76 and 78 may have flexible screens similar to the screen 56 shown in FIG. 2.

I claim:

1. A vehicle seat having a seat pan, a seat back which is reclinable from a normal substantially vertical position to a sleeping position in which the seat back forms a substantially continuous surface with the seat pan, and a generally vertical partition located behind the seat and mounted on rails for linear movement between a forward position adjacent to the top of the seat back when in its fully upright position and a rearward position adjacent to the top of the seat back when in its fully reclined position, and the partition remaining substantially vertical during said movement between its forward position and its rearward position.

2. A vehicle seat according to claim 1, wherein a flexible fabric screen is suspended from a cable which, when deployed extends from the upper edge of the partition to a location near the front of an armrest of the seat.

3. A vehicle seat according to claim 1, wherein a flexible fabric screen is suspended from a cable which, when deployed extends from the upper edge of the partition to a location near the front of an armrest of the seat.

4. A vehicle seat having a seat pan, a seat back which is reclinable from a normal substantially vertical position to a sleeping position in which the seat back forms a substantially continuous surface with the seat pan, and a generally vertical partition located behind the seat and mounted on rails for linear movement between a forward position adjacent to the top of the seat back when in its fully upright position and a rearward position adjacent to the top of the seat back when in its fully reclined position, wherein the rails extend from a position under the seat to a position which is in front of the rear edge of the partition when the partition is in its forward position.

5. A vehicle seat according to claim 3, wherein the partition has a recess in its rear surface dimensioned to receive a footrest of a second rearwardly located seat when the second seat is in its reclined position.

6. A vehicle seat according to claim 4, wherein a flexible fabric screen is suspended from a cable which, when deployed extends from the upper edge of the partition to a location near the front of an armrest of the seat.

7. A vehicle seat according to claim 3, wherein a flexible fabric screen is suspended from a cable which, when deployed extends from the upper edge of the partition to a location near the front of an armrest of the seat.

8. A vehicle seat according to claim 3, wherein a flexible fabric screen is suspended from a cable which, when deployed extends from the upper edge of the partition to a location near the front of an armrest of the seat.

9. A vehicle seat having a seat pan, a seat back which is reclinable from a normal substantially vertical position to a sleeping position in which the seat back forms a substantially continuous surface with the seat pan, and a generally vertical partition located behind the seat and mounted on rails for linear movement between a forward position adjacent to the top of the seat back when in its fully upright position and a rearward position adjacent to the top of the seat back when in its fully reclined position, wherein the partition has a recess in a rear surface thereof dimensioned to receive a footrest of a second rearwardly located seat when the second seat is in its reclined position.

10. A vehicle seat according to claim 11, wherein a flexible fabric screen is suspended from a cable which, when deployed extends from the upper edge of the partition to a location near the front of an armrest of the seat.

\* \* \* \* \*